(12) United States Patent
Liu et al.

(10) Patent No.: US 8,076,836 B2
(45) Date of Patent: Dec. 13, 2011

(54) CARBON NANOTUBE FILM, CARBON NANOTUBE FILM PRECURSOR, METHOD FOR MANUFACTURING THE SAME AND A LIGHT SOURCE

(75) Inventors: Kai Liu, Beijing (CN); Ying-Hui Sun, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 55 days.

(21) Appl. No.: 12/749,715

(22) Filed: Mar. 30, 2010

(65) Prior Publication Data

US 2010/0270911 A1    Oct. 28, 2010

(30) Foreign Application Priority Data

Apr. 27, 2009 (CN) .......................... 2009 1 0106938

(51) Int. Cl.
*H01J 1/62* (2006.01)
*H01J 63/04* (2006.01)

(52) U.S. Cl. ......... 313/503; 313/483; 313/498; 313/495

(58) Field of Classification Search .................. None
See application file for complete search history.

(56) References Cited

U.S. PATENT DOCUMENTS

| 7,442,414 | B2 * | 10/2008 | Ren et al. | 427/249.1 |
|---|---|---|---|---|
| 7,704,547 | B1 * | 4/2010 | Delzeit et al. | 427/8 |
| 2005/0136788 | A1 * | 6/2005 | Fink | 445/51 |
| 2009/0183770 | A1 * | 7/2009 | Nguyen | 136/256 |
| 2010/0006229 | A1 * | 1/2010 | Hung et al. | 156/378 |
| 2010/0159240 | A1 * | 6/2010 | Shah et al. | 428/368 |
| 2010/0173153 | A1 * | 7/2010 | Hata et al. | 428/367 |
| 2010/0328845 | A1 * | 12/2010 | Hiralal et al. | 361/502 |
| 2011/0089958 | A1 * | 4/2011 | Malecki et al. | 324/693 |
| 2011/0171469 | A1 * | 7/2011 | Shah et al. | 428/395 |
| 2011/0174519 | A1 * | 7/2011 | Shah et al. | 174/119 |

\* cited by examiner

*Primary Examiner* — Natalie Walford
(74) *Attorney, Agent, or Firm* — Altis Law Group, Inc.

(57) ABSTRACT

A carbon nanotube film includes a plurality of successively oriented carbon nanotubes joined end-to-end by Van der Waals attractive force therebetween. The carbon nanotubes define a plurality of first areas and a plurality of second areas. The first areas and the second areas have different densities of carbon nanotubes. A method for manufacturing the same is also provided. A light source using the carbon nanotube film is also provided.

15 Claims, 11 Drawing Sheets

US 8,076,836 B2

CARBON NANOTUBE FILM, CARBON NANOTUBE FILM PRECURSOR, METHOD FOR MANUFACTURING THE SAME AND A LIGHT SOURCE

RELATED APPLICATIONS

This application claims all benefits accruing under 35 U.S.C. §119 from China Patent Application No. 200910106938.0, filed on Apr. 27, 2009 in the China Intellectual Property Office.

BACKGROUND

1. Technical Field

The present disclosure relates to a carbon nanotube film, a carbon nanotube film precursor, a manufacturing method thereof and a light source including the carbon nanotube film.

2. Description of Related Art

Carbon nanotubes are tubules of carbon generally having a length of 5 to 100 micrometers and a diameter of 5 to 100 nanometers. Carbon nanotubes can be composed of a number of co-axial cylinders of graphite sheets and have recently attracted a great deal of attention for use in different fields such as field emitters, gas storage and separation, chemical sensors and high strength composites. However, it is very difficult to manipulate the carbon nanotubes at a microscopic level. Thus, assembling carbon nanotubes into macroscopic structures is of great importance to their applications at the macroscopic level.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments.

DETAILED DESCRIPTION OF EXEMPLARY EMBODIMENTS

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
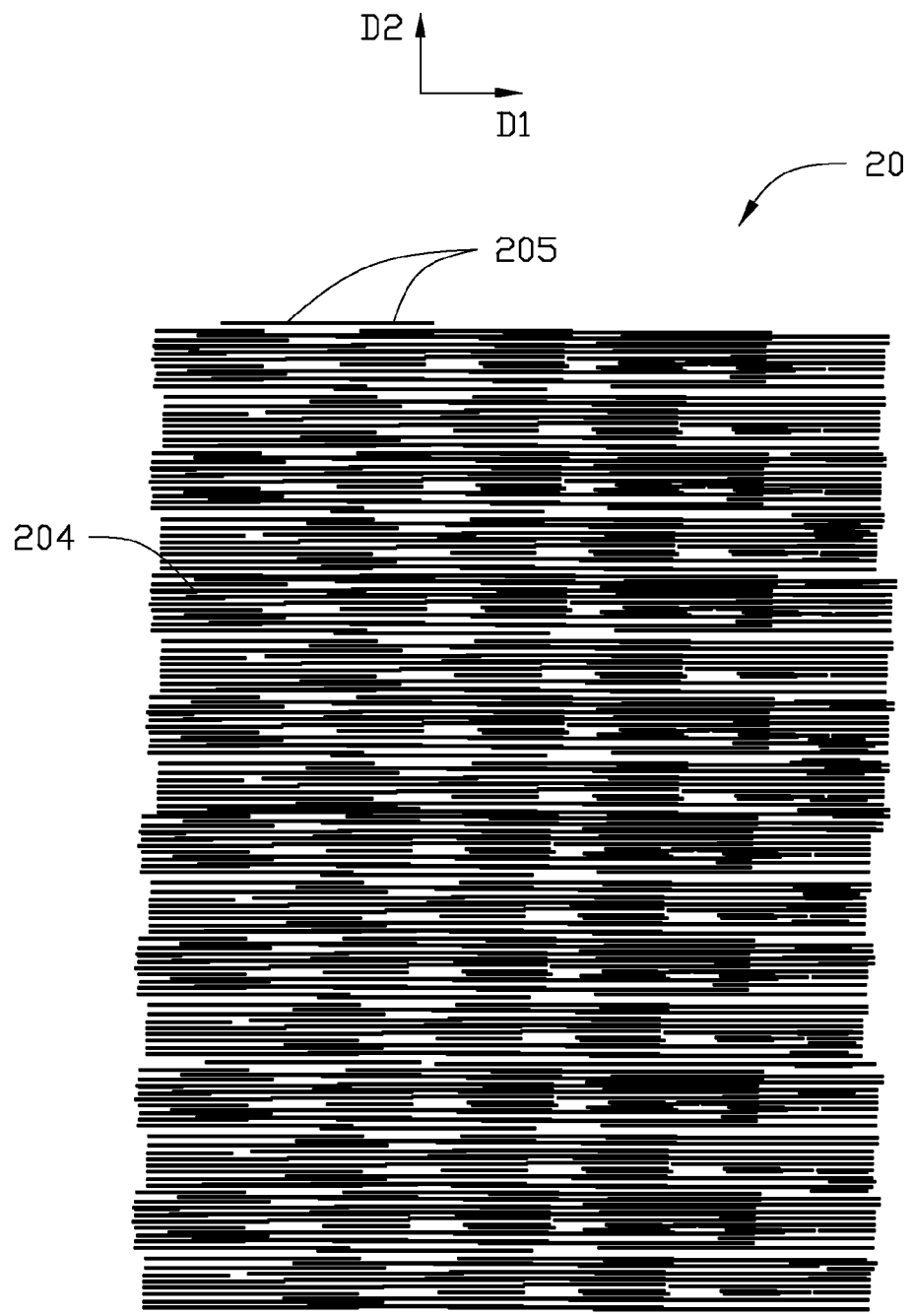
FIG. 1 is a schematic structural view of a carbon nanotube film of one embodiment.

Referring to the embodiment shown in FIG. 1, a carbon nanotube film 20 of one embodiment includes a plurality of successively oriented carbon nanotubes joined end-to-end by Van der Waals attractive force. The carbon nanotubes in the carbon nanotube film 20 can be substantially aligned in a first direction D1, as shown in FIG. 1.

Figure 2:
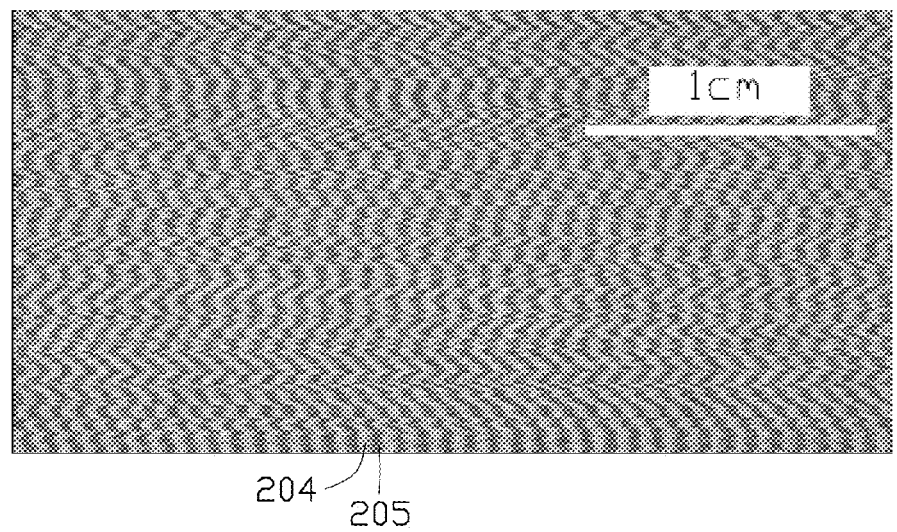
FIG. 2 shows a Scanning Electron Microscope (SEM) image of a carbon nanotube film of one embodiment.
Figure 3:
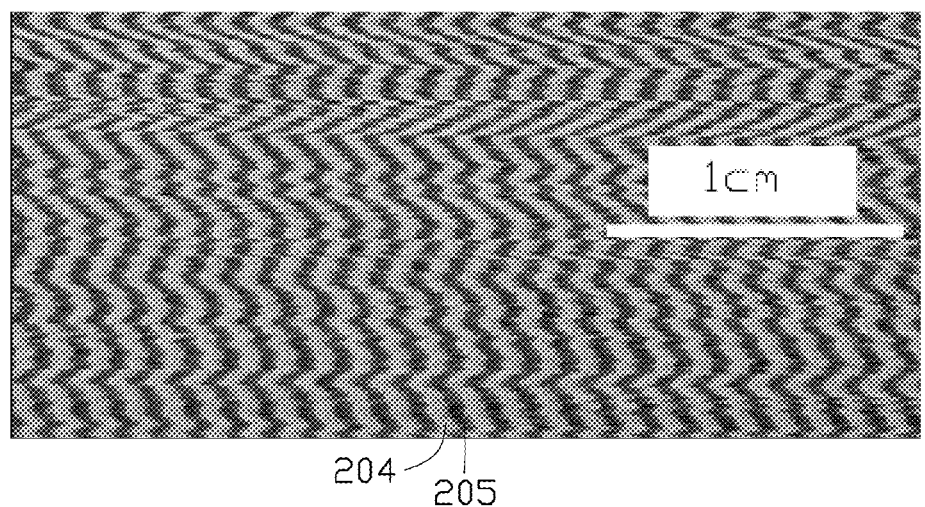
FIG. 3 shows an SEM image of another carbon nanotube film of one embodiment.

The carbon nanotube film 20 can be divided into a plurality of first areas 204 and a plurality of second areas 205 according to densities of carbon nanotubes. The first areas 204 and the second areas 205 have different densities of carbon nanotubes. For example, as shown in FIG. 1, the first areas 204 have a density of carbon nanotubes larger than that of the second areas 205. The first areas 204 and the second areas 205 are alternately arrange along the first direction D1. In each of the first areas 204 and the second areas 205, the carbon nanotubes can uniformly distribute along a second direction D2, as shown in FIG. 1. The second direction D2 can be perpendicular to the first direction D1. Referring to FIGS. 2-3, each of the first areas 204 and the second areas 205 has an approximately successive wave shape. The carbon nanotube film shown in FIG. 2 is drawn out from a carbon nanotube array with a height of about 400 microns, and the carbon nanotube film shown in FIG. 3 is drawn out from a carbon nanotube array with a height of about 600 microns. The carbon nanotube films of FIGS. 2-3 are drawn out at a drawing angle of about 65 degrees according to a method of one embodiment, which will be described in the following text.

Figure 4:
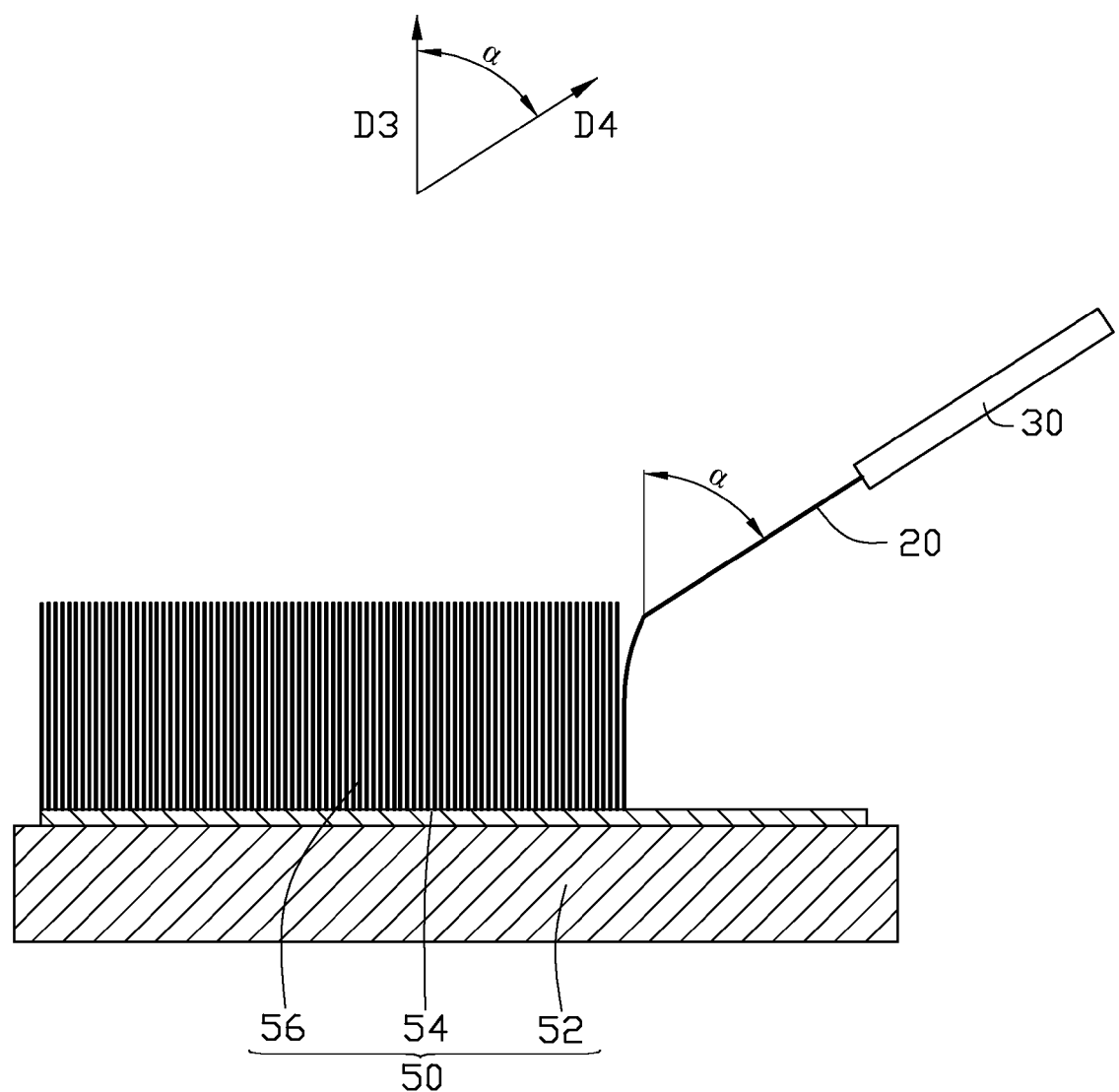
FIG. 4 is a schematic structural view of one embodiment of a carbon nanotube film precursor.

Referring to the embodiment shown in FIG. 4, a method for manufacturing the carbon nanotube film 20 includes the steps of:

Step (1): providing a carbon nanotube array 50 and a drawing tool 30, the carbon nanotube array 50 including a plurality of carbon nanotubes 56 arranged on a substrate 52 approximately along a growth direction D3 of the carbon nanotubes 56, as shown in FIG. 4;

Step (2): positioning the drawing tool 30 close to the carbon nanotube array 50 and selecting some carbon nanotubes 56 of the carbon nanotube array 50;

Step (3): drawing the selected carbon nanotubes 56 away from the carbon nanotube array 50 along a drawing direction D4 shown in FIG. 4 to fabricate the carbon nanotube film 20, an acute angle α of inclination between the drawing direction D4 and the growth direction D3 being less than or equal to 80 degrees. The acute angle α is also referred to as drawing angle α.

In step (1), the carbon nanotube array 50 can be manufactured using a chemical vapor deposition method, a plasma vapor deposition method or an arc discharge method. In one embodiment, the carbon nanotube array 50 is manufactured using a chemical vapor deposition method, and this method includes the steps of:

Step (a): providing the substrate 52. The substrate 52 can be a p-type or n-type silicon wafer, or a silicon wafer with a film of silicon dioxide thereon. A smoothness of a surface of the substrate 52 is less than 1 micron for facilitating a uniform formation of a catalyst layer directly on the surface of the substrate 52.

Step (b): depositing a catalyst on the substrate 52 to form a catalyst layer 54. The catalyst can be iron, cobalt, nickel or alloys of the same. The catalyst layer 54 has a thickness in the range of about several nanometers to about several hundred nanometers.

Step (c): annealing the substrate 52 with the catalyst layer 54 in air at about 300 to about 400° C. for about 5 to about 15 hours, thereby oxidizing the catalyst layer 54 to form nano-sized catalyst oxide particles.

Step (d): putting the substrate 52 with the nano-sized catalyst oxide particles into a furnace (not shown) and heating the furnace up to a predetermined temperature with flowing protective gas. The protective gas can be noble gas or nitrogen. In the preferred method, argon is used as the protective gas. The predetermined temperature varies according to the catalyst used. In the preferred method, iron is a catalyst, and the predetermined temperature is about 500 to about 700° C.

Step (e): introducing a mixture of a carbon source gas and a carrier gas into the furnace, thus forming the carbon nanotubes 56 extending from the substrate 52 along a growth direction D3 as shown in FIG. 4. The carbon source gas can be acetylene, ethylene, or another suitable chemical compound which contains carbon. The carrier gas can be a noble gas or nitrogen. A flow rate of the carbon source gas is about 20 to about 50 standard cubic centimeters per minute. A flow rate of the carrier gas is about 200 to about 500 standard cubic centimeters per minute. Thus, the carbon nanotube array 50 of step (1) is formed.

In step (2), the drawing tool 30 can be an adhesive tape, tweezers, or another tool allowing multiple carbon nanotubes to be gripped and pulled simultaneously. In one embodiment, adhesive tape with a predetermined width applies as a drawing tool 30 to contact and select some carbon nanotubes 56 of the carbon nanotube array 50. The selected carbon nanotubes 56 are also referred as carbon nanotube bundles. A carbon nanotube bundle is any plurality of carbon nanotubes formed in a contiguously adjacent group in the carbon nanotube array 50.

In step (3), selected or initial carbon nanotube bundles, which are attached to the drawing tool 30, are first drawn out from the carbon nanotube array 50 along the drawing direction D4 shown in FIG. 4 to fabricate the carbon nanotube film 20. During the drawing process or pulling process, as the initial carbon nanotube bundles are drawn out, other carbon nanotube bundles are also drawn out end to end due to the Van der Waals attractive force between ends of adjacent bundles. Then, the carbon nanotube film 20 is fabricated.

In step (3), when the carbon nanotube film 20 is not cut off from the carbon nanotube array 50 and there are still some carbon nanotubes 56 existing on the substrate 52, the carbon nanotube film 20 and the remaining carbon nanotube array 50 form a carbon nanotube film precursor. The carbon nanotube film precursor includes the substrate 52, some remaining carbon nanotubes 56 on the substrate 52, and the carbon nanotube film 20 connected to the remaining carbon nanotubes 56.

Figure 5A:
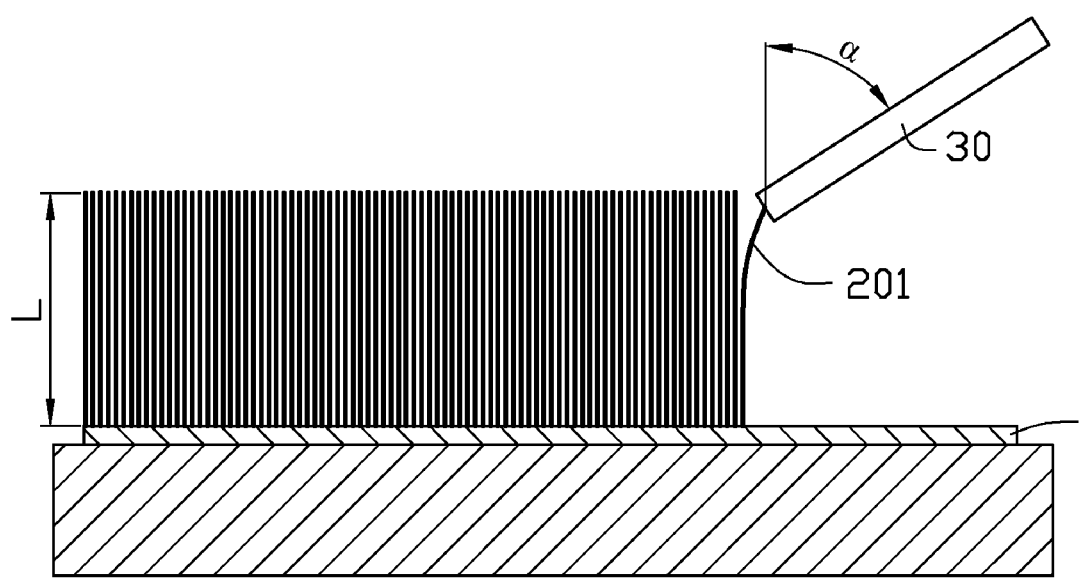
FIGS. 5A-5C illustrates successive stages of one embodiment of a method for manufacturing the carbon nanotube films of FIGS. 1-3.

Furthermore, the drawing process of step (3) can be further divided into several successive stages, as shown in FGS. 5A-5C. These successive stages include:

(I) As shown in FIG. 5A, the drawing tool 30 is applied to contact a top end edge of the carbon nanotube array 50 to select a plurality of first carbon nanotube bundles 201.

Figure 5B:
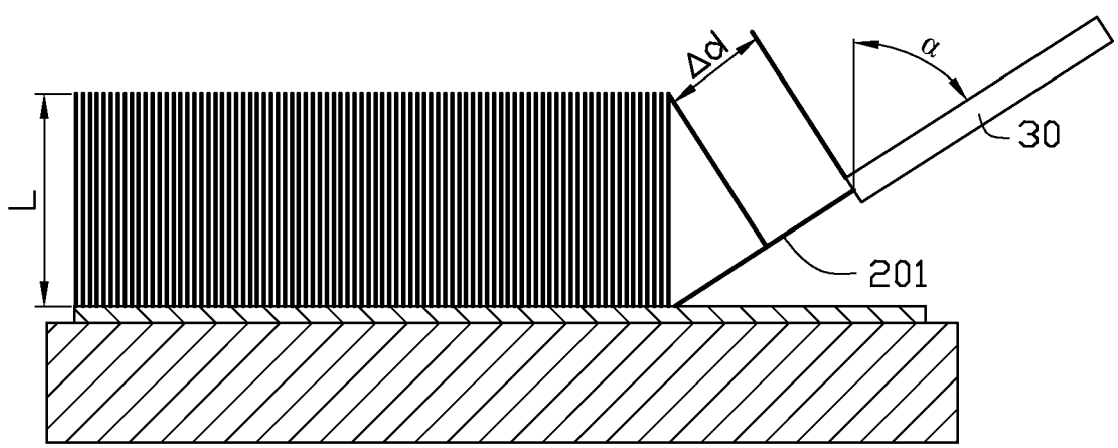

(II) As shown in FIG. 5B, top ends of the first carbon nanotube bundles 201 are first separated from the carbon nanotubes 56 when the drawing tool 30 is moved. Then, bottom ends of the first carbon nanotube bundles 201 are separated from the substrate 52.

(III) When the bottom ends of the first carbon nanotube bundles 201 are moving away from the substrate 52, the bottom ends of the first carbon nanotube bundles 201 begin to draw bottom ends of adjacent second carbon nanotube bundles 202 due to the Van der Waals attractive force therebetween.

Figure 5C:
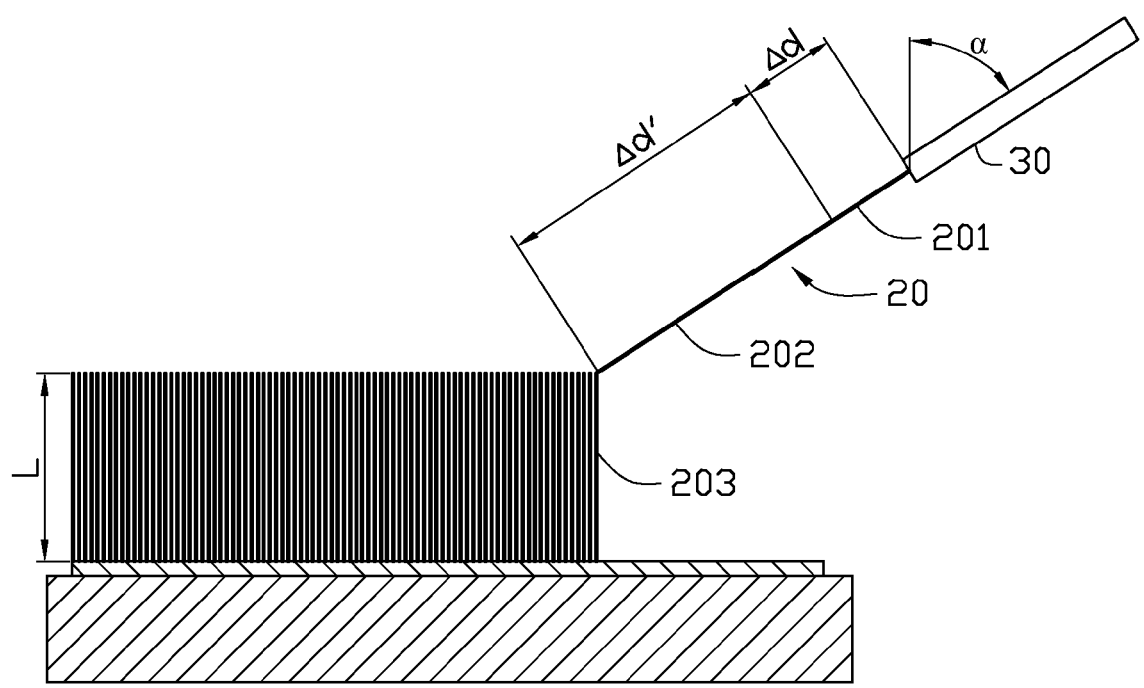

(IV) The bottom ends of the second carbon nanotube bundles 202 are first separated from the substrate 52 before top ends of the second carbon nanotube bundles 202 are separated from the substrate 52. As shown in FIG. 5C, the first carbon nanotube bundles 201 and the second carbon nanotube bundles 202 are separated from the substrate 52.

(V) As the top ends of the second carbon nanotube bundles 202 are moving away from the substrate 52, the top ends of the second carbon nanotube bundles 202 begin to draw top ends of adjacent third carbon nanotube bundles 203 due to the Van der Waals attractive force therebetween.

Repeating stage (II), stage (III), stage (IV) and stage (V), the carbon nanotube film 20 can be formed. Further, in different stages, the drawing tool 30 can move different distances in the drawing direction D4. For example, the height of the carbon nanotubes 56 is supposed to be L. In stage (II), as shown in FIG. 5B, a distance $\Delta d$ that the drawing tool 30 moves in the drawing direction D4 is $L(1+\cos \alpha)$. While in stage (IV), a distance $\Delta d'$ that the drawing tool 30 moves in the drawing direction D4 is $L(1+\cos \alpha)$. A difference in value between the distance $\Delta d$ and the distance $\Delta d'$ is $2L \cos \alpha$. Since the carbon nanotube film 20 is fabricated at a uniform speed, the first carbon nanotube bundles 201 of the stage (II) are separated from the carbon nanotube array 50 at a slower rate than the second carbon nanotube bundles 202 of stage (IV). In other words, the first carbon nanotube bundles 201 are separated from the carbon nanotube array 50 at a first rate and the second carbon nanotube bundles 202 are separated from the carbon nanotube array 50 at a second rate, which is larger than the first rate. The rate difference can result in the distribution of densities of carbon nanotubes of the carbon nanotube film 20 as described above. The first areas 204 are the results of stage (II) and stage (III). The second areas 205 are the results of stage (IV) and stage (V), and thus, have a density smaller than that of the first areas 204.

The carbon nanotube film 20 and the method for manufacturing the same have been described above. Some examples of using the carbon nanotube film 20 are described below.

Figure 6:
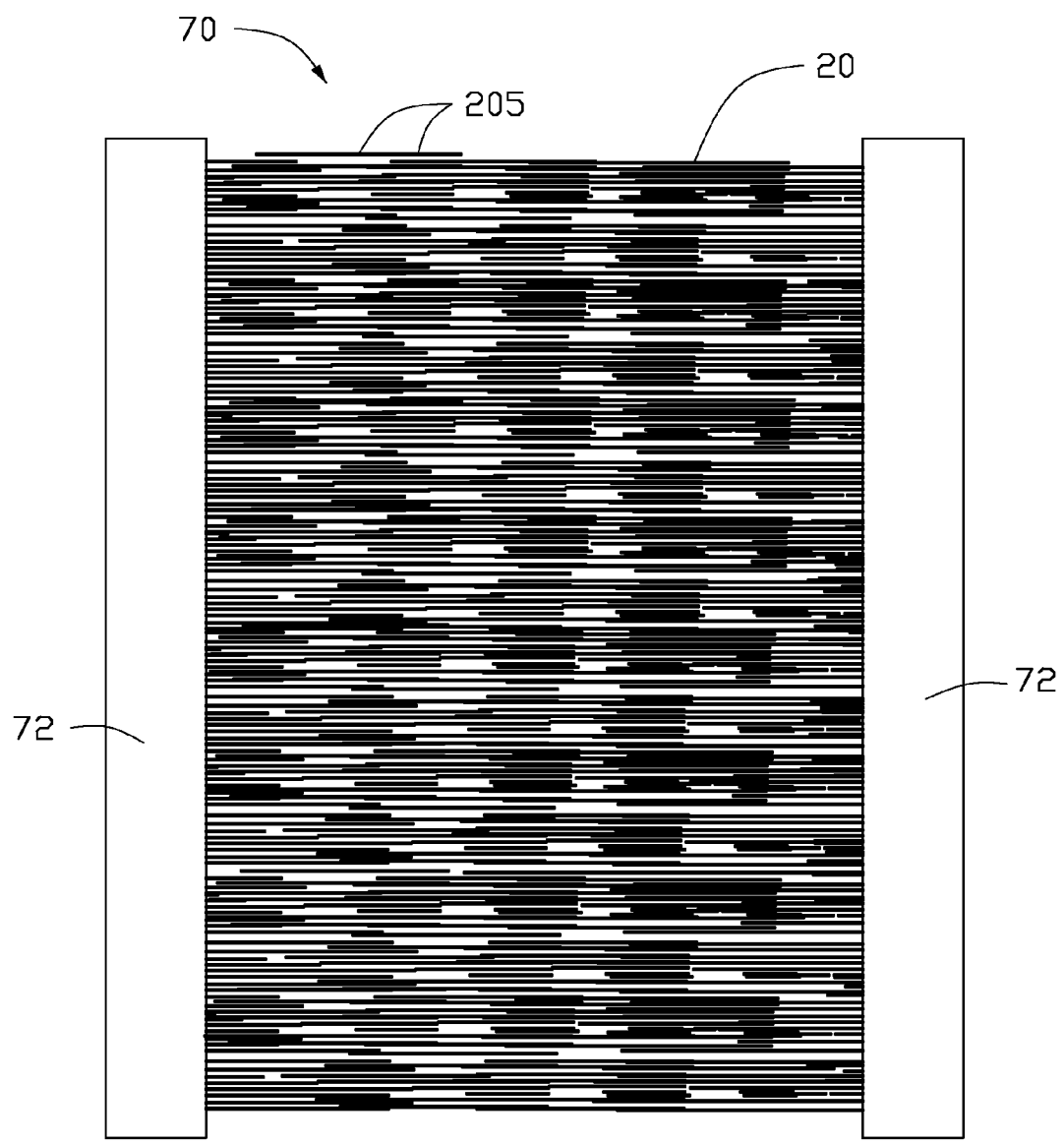
FIG. 6 is a schematic structural view of a light source of one embodiment.

Referring to the embodiment shown in FIG. 6, a light source 70 of one embodiment includes a carbon nanotube film 20 and two electrodes 72. The two electrodes 72 electrically connect to the carbon nanotube film 20. The two electrodes 72 are disposed on opposite ends of the carbon nanotube film 20.

When an electrical current flows through the carbon nanotube film 20 via the two electrodes 72, the carbon nanotube film 20 can emit polarized light. The polarization direction of the polarized light can be parallel to the axial direction of the carbon nanotubes of the carbon nanotube film 20, because the carbon nanotubes are one-dimensional material and electrons have restricted movement along the axial direction of the carbon nanotubes.

Figure 7:
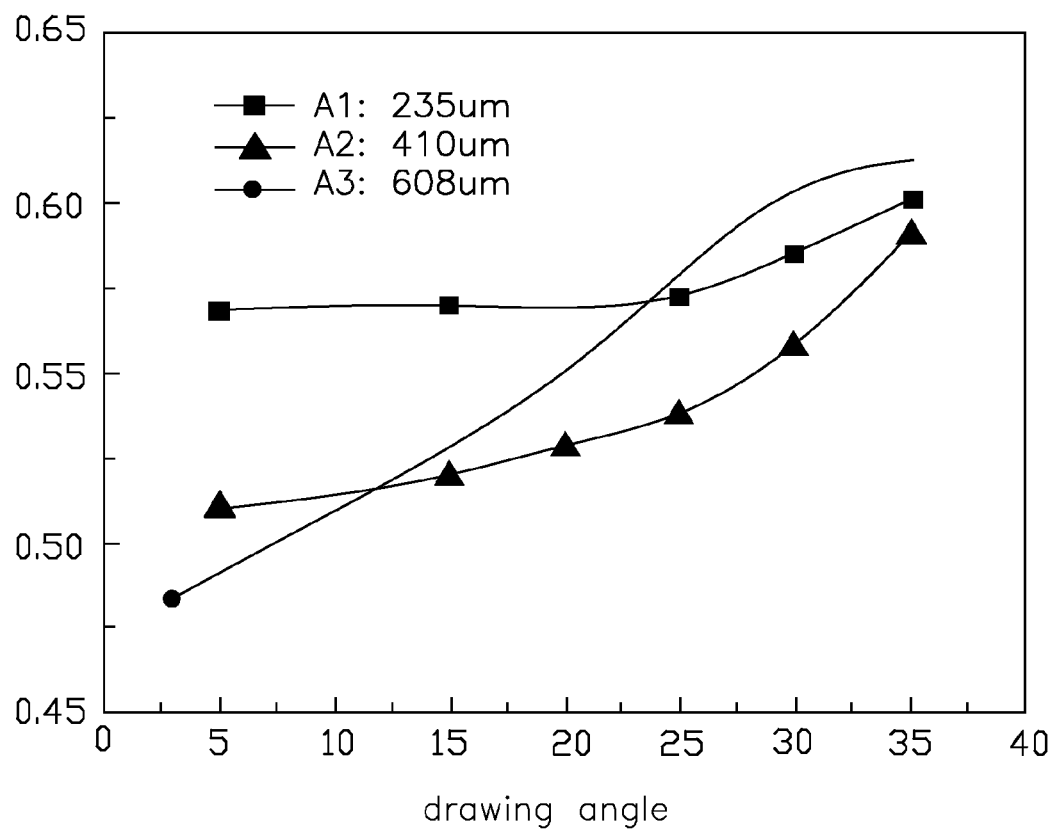
FIG. 7 shows the relationship between degree of polarization and drawing angle for carbon nanotube films which are drawn out from carbon nanotube arrays with different heights.

The relationship between degree of polarization and drawing angle for carbon nanotube films are illustrated in FIG. 7. The curve A1 in the FIG. 7 represents a carbon nanotube film which is drawn out from a carbon nanotube array having a height of about 235 microns. The curve A2 in the FIG. 7 represents a carbon nanotube film which is drawn out from a carbon nanotube array having a height of about 410 microns. The curve A3 in the FIG. 7 represents a carbon nanotube film which is drawn out from a carbon nanotube array having a height of about 608 microns. As shown in FIG. 7, the larger the drawing angle, the larger the degree of polarization of emitted polarized light. The higher the carbon nanotube array, the larger the degree of polarization of emitted polarized light.

Further, in the carbon nanotube film 20, the first areas 204 and the second areas 205 have different densities of carbon nanotubes, resulting in the first areas 204 and the second areas 205 having different resistances. Thus, when an electrical current flows through the carbon nanotube film 20, the first areas 204 and the second areas 205 will have different luminous intensities. In other words, the carbon nanotube film 20 can produce alternately dark and bright wave shaped bands.

Figure 8:
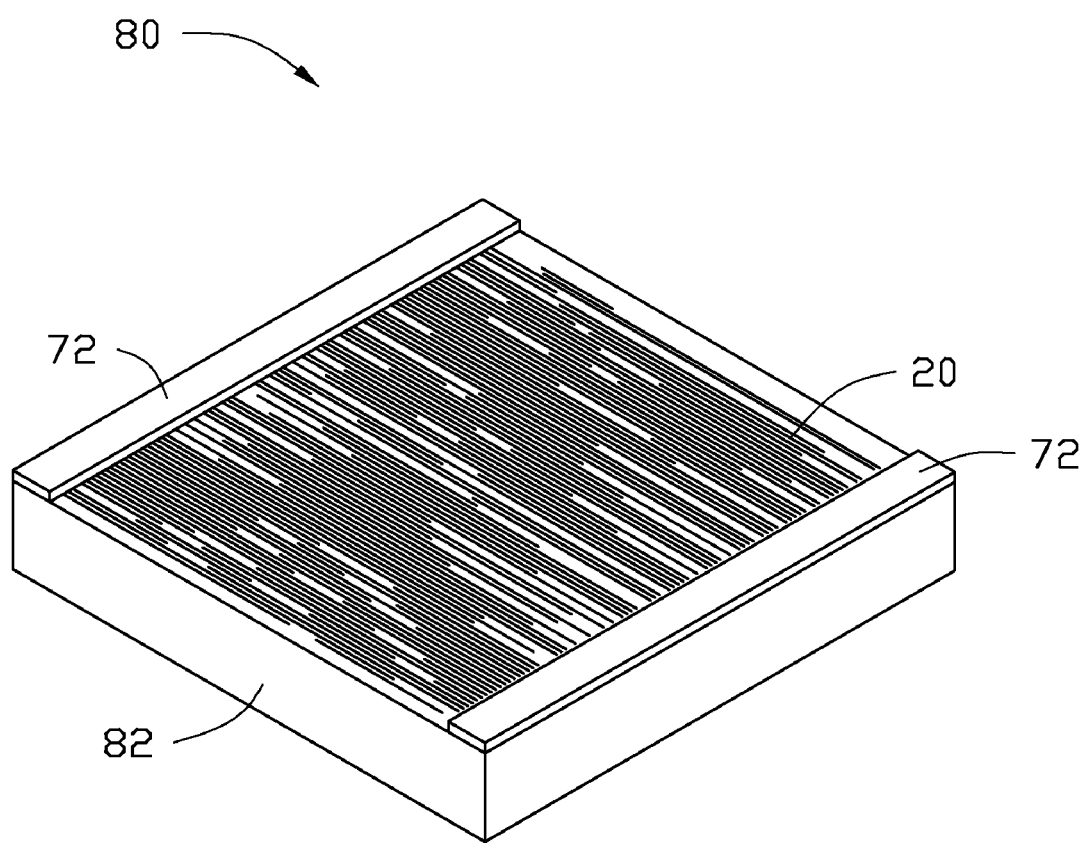
FIG. 8 is a schematic structural view of a light source of one embodiment.

Referring to the embodiment shown in FIG. 8, a light source 80 of one embodiment includes the carbon nanotube film 20, the two electrodes 72 and a support 82. The carbon nanotube film 20 is supported on the support 82. The support 82 can be transparent or translucent.

Figure 9:
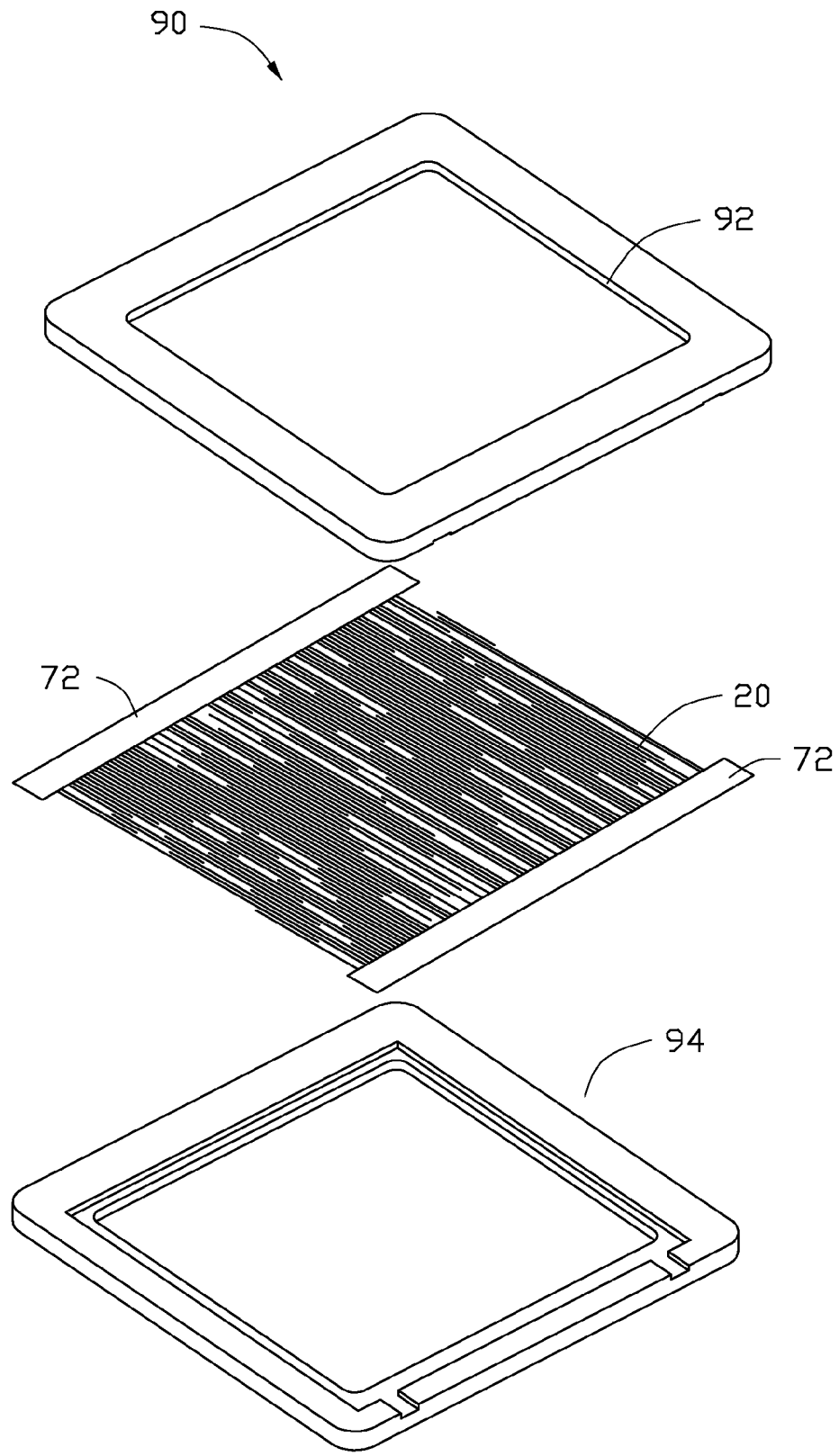
FIG. 9 is a schematic structural view of a light source of another embodiment.

Referring to the embodiment shown in FIG. 9, a light source 90 of another embodiment includes the carbon nanotube film 20, the two electrodes 72, a first frame 92 and a second frame 94. The carbon nanotube film 20 is sandwiched between the first frame 92 and the second frame 94.

Finally, it is to be understood that the above-described embodiments are intended to illustrate rather than limit the disclosure. Variations may be made to the embodiments without departing from the spirit of the disclosure as claimed. Elements associated with any of the above embodiments are envisioned to be associated with any other embodiments. The above-described embodiments illustrate the scope of the disclosure but do not restrict the scope of the disclosure.

What is claimed is:

1. A carbon nanotube film comprising:
    a plurality of first areas and a plurality of second areas, the first areas and the second areas each comprising a plurality of successively oriented carbon nanotubes joined end-to-end by Van der Waals attractive force therebetween, wherein the first areas and the second areas have different densities of carbon nanotubes.

2. The carbon nanotube film of claim 1, wherein the first areas and the second areas are alternately arranged along a first direction.

3. The carbon nanotube film of claim 2, wherein the first direction is approximately parallel to an axial direction of the carbon nanotubes.

4. The carbon nanotube film of claim 2, wherein carbon nanotubes of each of the first areas and the second areas, are approximately uniformly distributed along a second direction approximately perpendicular to the first direction.

5. The carbon nanotube film of claim 4, wherein the carbon nanotubes of each of the first areas and the second areas, are approximately parallel to one another.

6. The carbon nanotube film of claim 1, wherein each of the first areas and the second areas has a successive wave shape.

7. A light source comprising:
    a carbon nanotube film comprising a plurality of first areas and a plurality of second areas, the first areas and the second areas each comprising a plurality of successively oriented carbon nanotubes joined end-to-end by Van der Waals attractive force therebetween, wherein the first areas and the second areas have different densities of carbon nanotubes; and two electrodes electrically connected to the carbon nanotube film.

8. The light source of claim 7, further comprising a support supporting the carbon nanotube film.

9. The light source of claim 8, wherein the support is transparent or translucent.

10. The light source of claim 7, further comprising a first frame and a second frame, wherein the carbon nanotube film is sandwiched between the first frame and the second frame.

11. The light source of claim 7, wherein the first areas and the second areas are alternately arranged along a first direction, and the first direction is approximately parallel to an axial direction of the carbon nanotubes.

12. The light source of claim 11, wherein the two electrodes are disposed on opposite ends of the carbon nanotube film along the first direction.

13. The light source of claim 11, wherein carbon nanotubes of each of the first areas and the second areas, are approximately uniformly distributed along a second direction approximately perpendicular to the first direction.

14. The light source of claim 11, wherein carbon nanotubes of each of the first areas and the second areas, are parallel to one another.

15. The light source of claim 11, wherein each of the first areas and the second areas has a successive wave shape.

* * * * *